Feb. 4, 1958 P. H. E. CLAESSON 2,822,423

FIRE AND POLICE INTERCOMMUNICATION SYSTEM

Filed July 30, 1954 2 Sheets-Sheet 1

INVENTOR:

Per H. E. Claesson

BY Glascock Downing & Seebold

ATTORNEYS

Feb. 4, 1958 P. H. E. CLAESSON 2,822,423

FIRE AND POLICE INTERCOMMUNICATION SYSTEM

Filed July 30, 1954 2 Sheets-Sheet 2

INVENTOR:
Per H.E. Claesson

BY Glascock Downing & Seebold,
ATTORNEYS 2,822,423

FIRE AND POLICE INTERCOMMUNICATION SYSTEM

Per H. E. Claesson, Danderyd, Sweden

Application July 30, 1954, Serial No. 446,803
Claims priority, application Sweden March 19, 1949
16 Claims. (Cl. 179—5)

This case is a continuation-in-part of my prior application, Serial No. 150,121, filed March 17, 1950, now abandoned.

This invention pertains to communication systems, and particularly to a communication system especially adapted to intercommunications between a central station and a series of posts or calling stations at which call boxes or the like are located. A particular application for such a system is in police and fire reporting networks in which it is desired to enable any station outside the central station to call the central station.

Heretofore it has generally been the practice for a municipality to provide entirely separate fire and police reporting systems. In general, the police network has been arranged for oral or telephonic communication from call boxes, while the fire reporting system has generally been purely code signalling in the general nature of a telegraph system. The desirability of having a large number of call boxes for fire purposes has made it necessary, for reasons of economy, to employ a common circuit for all of the boxes, and in view of their relatively infrequent use, it has also been common to employ a series connection of the boxes so that a break in any part of the system is immediately indicated at the central office by a continuously open circuit. This series arrangement has the great disadvantage, for telephony, that the line cannot be balanced, resulting in relatively high noise conditions and the occurrence of cross-talk from other circuits. Where telephone communication is desired, ordinary arrangements do not provide any convenient way of checking the continuity of the circuits, since there is no possibility of obtaining current through the circuit except when a call station is connected thereto.

It is accordingly a principal object of the present invention to provide a combined fire and police (or other combined service) calling system in which both telephone and code station identification is provided at each remote station, and which has the advantage of bridging or parallel connection of the remote stations and provides an arrangement by which the continuity of the line may be checked at any time.

A further object of the invention is to provide a system of this kind which has great flexibility, in that it can be extended and enlarged almost indefinitely in size merely by adding additional loops each of which has connected thereto a considerable number of calling stations.

Still another object of the invention is to provide a system of this type which not only permits calls and signals to be transmitted to a central station from remote call boxes, but also provides for a signal controllable from the central station to indicate at all of the call boxes on one loop that communication is desired.

Still another object of the invention is to provide a system of this kind including a call box arrangement for each remote station and such that the opening of the box will automatically transmit one kind of signal to the central station, for example for a fire alarm system, but including arrangements whereby an authorized individual (such as a policeman or watchman) may open the call box for communicating with the central station without transmitting the emergency signal, and arrangements whereby one type of call (i. e. an emergency call) always has the priority over the other type of call.

The above and other objects and advantages of the invention will best be understood by referring to the following detailed specification of a preferred embodiment thereof, taken in connection with the appended drawings, in which.

Figures 1, 2:
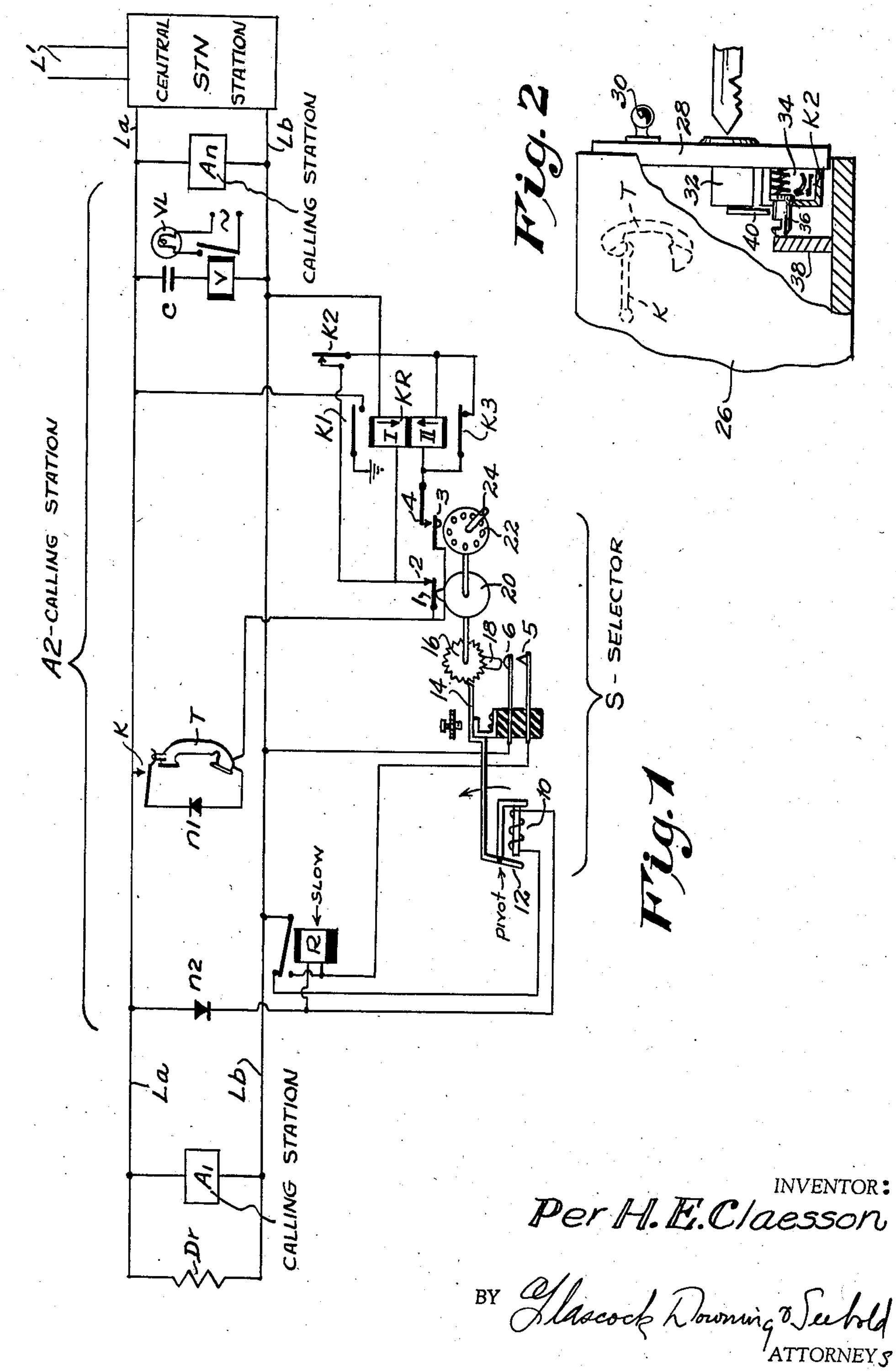
Fig. 1 is a schematic diagram of portions of a complete system in accordance with the invention, the equipment at one call box or calling station being shown in some detail.
Fig. 2 is a fragmentary view, partly in section, illustrating an interlock arrangement for the door of a call box.

Referring now to Fig. 1 of the drawings, there is shown the general arrangement of a complete system including a central station STN, a typical loop circuit including lines L*a* and L*b* extending from the central station and having calling stations or boxes A1, A2 and A*n* bridged across the lines at successive points, and a terminating impedance D*r* bridged across the line at its end farthest from the central station, for a purpose to be described. Other loops or lines, such as L', may terminate at the central station STN, and certain of the central equipment may be common to the various loops as will appear below.

The equipment constituting a particular calling station A2 is illustrated in detail in Fig. 1, and it is to be understood that the other calling stations include similar equipment, only one calling station being shown completely for purposes of illustration.

Each station includes a step-by-step driven relay S (a so-called selector), and an auxiliary relay R which in the usual way controls the home position of the selector. A telephone handset, induction coil, a relay KR (which may be a polarized relay), an alternating current relay V and two rectifiers *n*1 and *n*2 are also provided. The relay KR is preferably an electro-magnetic relay in a magnetic circuit with such a degree of remanence that it remains in operated position after being magnetized by one winding and releases only after demagnetizing as by another winding. The selector S is provided with 3 groups of contacts namely 1—2, 3—4 and 5—6. Of these contact group 1—2 is operated in the rest or home position, contact group 3—4 is operated in particular different positions corresponding to the respective calling stations, and 5—6 is operated in the home or rest position of the selector but only when the magnet is energized.

Before completing the detailed description of the station A2, a brief resume of the system operation will aid in understanding the operation. Since on any one loop such as L*a*—L*b* all the calling stations are in parallel, matters are arranged so that for one type of call operation of a switch at any station will initiate at the central office the transmission of selector pulses to that loop, and hence to all stations thereon. All of the selectors at the calling stations will step in synchronism with the pulses, but only at that particular station at which a call was initiated is the equipment in condition to stop the pulses. Thus, by counting the pulses transmitted, the central station will be advised of the number or location of the calling station then connected to the loop. This type of call will in the following be described as an "emergency" call.

The terminating impedance D*r* at the end of the loop has a relatively high ohmic value, compared to the impedance of the individual station equipments, so that a rest current will flow in the loop from the central station whenever the circuit is to be tested. If the current of the line decreases below this "rest" value, it will indicate an open or high resistance condition somewhere in the loop. When the individual telephone equipment at a station is connected over the line, the current in the line will increase and another type of call is initiated, which in the following will be designated as a "routine" call. In this way, even though the system, in the telephone aspect, is essentially a bridged party-line system, provision is made for testing the loop when no calling station equipment is connected thereto. The fault test may, of course, be continuous between periods in which calling stations are operated.

Returning now to the apparatus at station A2, and particularly to the selector S, this is shown as a known form of rotary selector (see Swedish Patent 85,810) which causes operation of certain contacts only when a predetermined number of pulses, which may be chosen for each individual selector, is received. It comprises a magnet 10, armature 12 and pawl 14 arranged to advance a toothed wheel 16 one step for each operation of the magnet. The pawl, or a member pivoting therewith, is shown as carrying a pair of normally open contacts 5—6 which rock towards the wheel 16 on each energization of magnet 10. However, the contacts are not closed during the stepping operation except when a lobe 18 on wheel 16 arrives at the position shown. When the magnet is next energized, contact 6 will strike the lobe and be held against further swinging so that contact 5 will close against contact 6. On the same shaft as wheel 16 is a cam wheel 20 having a lobe which closes contact set 1—2, even though magnet 10 is then de-energized and contact 5—6 open. The latter position defines the "home" or zero position of the selector. A further wheel 22 has a lobe 24 which closes the other contacts 3—4 after receipt of a number of pulses corresponding to the identity of the calling station A2.

The selector just described is an economical and convenient one for the purpose. However, it is to be understood that other selectors of this type may be employed; e. g., a selector of the rotary switch type in common use in connection with machine switching telephone systems of the step-by-step type. The present invention does not depend upon the particular nature of this selector.

In the present system, an emergency call (such as a fire alarm call) is initiated by any person immediately upon opening the door of the call box and lifting the handset. This sets in operation equipment at the central station which identifies the location of the box which was operated. Also, telephonic communication with the central station may be had. In any event, however, the emergency call has been signalled. However, if a policeman or other authorized person wishes to make a routine or report call, he can operate the apparatus at the box so that an emergency call will not be transmitted. This permits a routine call to be made as desired, without in any way depriving the system of its emergency warning function.

Referring now to Fig. 2 of the drawings, a portion of a typical call box is shown, including the housing 26, a hinged door 28 shown slightly ajar and having a knob 30 by which it may be opened by any person, and an ordinary cylinder lock 32 which does not, however, need to lock the door. The door may have mounted thereon a switch casing 34 having a plunger 36 urged outwardly by a spring as shown, and in its outward position allowing contacts K2 to open. The plunger is held in, to close the contacts when the door is fully closed, as by striking an abutment 38. Thus, if the door is opened in the ordinary way, contacts K2 will be opened and prepare the circuitry for sending in an emergency call. If the caller wishes, the telephone handset T may be used for conversation with the central operator, by equipment to be described. However, when an authorized person wishes to use the box for a routine report or oral call, he opens the box by inserting a key in lock 32, whose lug 40, when turned, enters a slot in plunger 36 and prevents it from moving out as the door opens, so that contacts K2 will remain closed. Alternative arrangements for distinguishing between emergency callers and routine report callers can readily be devised, and it is not essential that the possession of a key be used to distinguish such persons. Also, a key may be provided which actually unlocks the door, with provision for opening by the public in emergencies by breaking a glass or operating a different handle to open the box.

According to another feature of the invention, the initiation of an emergency call prevents the use of the loop for a routine call, thus giving priority to emergency signals. If then a routine call is under way this is interrupted when the emergency call is initiated, since the selectors all advance and open their respective telephone circuits (contacts 1—2). However, when used for routine or report calls, more than one station on the loop can communicate with the central office (and talk with others at different stations).

In order to achieve the above result, the selector S is employed. Therefore, in Fig. 1 of the drawings any telephonic device T, comprising handset and induction coil, may be connected to the line through its hookswitch K when the selectors S of all the subscriber's stations are in their normal or home positions, shown in Fig. 1, wherein the contacts 1—2 and K2 are in closed positions. However, when an emergency call is made, only one calling station can be connected to the line (by the action of the selecting device S causing the normally open contacts 3—4 of Fig. 1 to be closed). Thus, each caller is connected to the line by a different number of steps of the associated selector S.

When an emergency call is made, all selectors S are advanced synchronously by pulses from the central station, whereby all the normally closed contacts 1—2 of the selectors are opened. By the step-by-step advance of the selector S the calling station is eventually connected to the line, at which point the step-by-step advance is stopped.

As will be described below, the selectors are advanced from home position by pulses sent out by the central station, when a call is initiated, and advanced further to home position again by other pulses also supplied from the central station after completion of the connection. The stepping pulses from the central station are unidirectional in polarity and are passed by the rectifier *n*2, while the telephone T receives talking current in the other direction through the rectifier *n*1. When the door is opened and the telephone lifted, in making an emergency call, the contacts K2 will be open, so that they no longer short the upper winding of relay KR and the relay operates by current furnished through the telephone T. Relay KR thus grounds the line L*a* at contacts K1, and being a polarized or remanence relay, remains in this position until restored by energizing winding II.

Relay R is a slow release relay whose normally open contacts are in series with magnet 10 of the selector S, and is provided so that the selectors are stopped at home position when homing pulses are sent from the central station.

When the homing pulses are received (a number sufficient to home all the selectors on the line are transmitted) all the selectors advance until, at their respective home positions, contacts 5—6 are closed. Since the selector is of the direct driven type as described above, the contacts 5—6 close when the magnet 10 is in energized condition, and relay R is energized to open the circuit through the magnet 10, remaining operated throughout the remainder of the homing pulse series, whereby the selector S is stopped in its step-by-step movement. Contacts 1—2 are closed when the magnet 10 is in the home position, so that the telephone circuit is left ready for calling purposes if a report or routine call is later to be initiated.

For the purpose of permitting the central operator to give a signal at all stations on a loop, a signal lamp or the like VL is provided at each call box, energized by an alternating current relay V connected across the line in series with a capacitor as shown. These are energized by alternating current supplied from the central station when the signals are to be operated. When any box is answered, the signal lamps at all boxes will be interrupted by contacts of relay LR1. This prevents more than one officer attempting to answer, e. g., at other boxes, on the loop.

The equipment at the central station will now be described, in connection with operation of the calling station equipment for different kinds of calls, such as emergency and routine calls.

Figure 3:
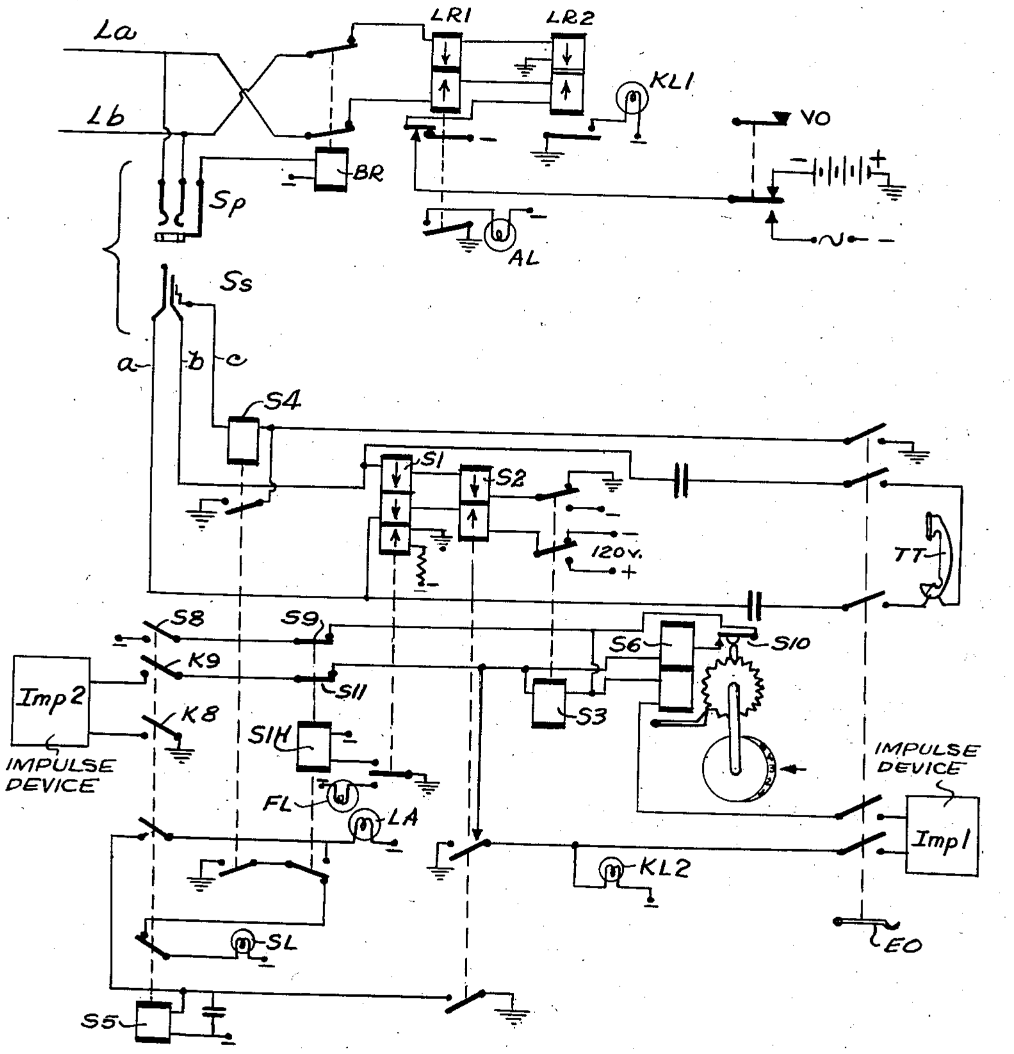
Fig. 3 is a schematic diagram of the arrangement and connection of apparatus at the central station.

In the case of a manual exchange shown in Fig. 3 by way of example, the line L*a*—L*b*, common to a number of calling stations, is brought out to a jack S*p* on an exchange panel in the usual way, this panel being provided with calling and termination signal lamps of the ordinary kind. The common devices of the exchange panel consist of, besides those normally to be found, such as answering and ringing leads, speaking device and signal lamps, also an impulse device I*mp*1 for the advancing of the selectors, as well as devices for the reception of emergency signals and for the indication of the same.

As is clear from Fig. 3, the line equipment consists of a line relay LR1, a break relay BR, an emergency relay LR2, a call-up lamp AL, an emergency lamp KL1, and a switch device VO for transmitting A. C. signals to the V relays.

Each lead in the exchange panel includes an operating switch EO, an emergency relay S2, an impulse relay S3, a holding relay S4, a current measuring relay S1 with its component auxiliary relay S1H, a number board or call indicator S6, a readjusting relay S5, a control lamp LA, an emergency lamp KL2, a termination lamp SL and a fault lamp FL.

Common to the exchange panel are two impulse transmitters I*mp*1 and I*mp*2. Of the other devices usually to be found on an exchange panel, such as dividing switches and loop leads with their accompanying devices, only one has been shown on the drawing, namely the telephone TT.

The device works in the following way; for a routine call. When the telephone is lifted at a station, for example A2, the contact K is closed (Fig. 1). Because the selector S is in the home position, a loop current circuit is closed via the line L*a*—L*b* whereby the relay LR1 at the exchange is attracted and the call-up lamp AL is lit.

Thereupon the following circuit is established; from ground, the upper winding of relay LR2, upper winding of relay LR1, the upper contact of relay BR, line lead L*b*, contact K2 at the station, contacts 1—2 of the selector, telephone T, contact K, lead L*a*, the lower contact of BR, lower winding of LR1, lower winding of LR2, the break contacts of LR1, break contacts of switch VO and to negative battery, the positive battery terminal being grounded.

This signals the operator at the central station to connect the cord SS to the jack SP and the relay S1 is attracted in parallel with LI1. When the manual operating switch or key EO is operated, the relays BR and S4 are attracted in series with each other and with the *c*-lead of the connecting cord plug SS. By operating, relay BR disconnects the relay LR1 which releases so that the lamp AL is extinguished.

The operator can now complete the conversation in the ordinary way by means of the telephone device TT. If a call should come from one or more other stations while the conversation already commenced is continuing, such a call is connected in parallel on the line, in the same manner as at the station A2 as previously described.

When all the routine callers have replaced the telephones the relays S1 and S1H release and the termination lamp SL is lit. The following circuit is then established: ground, the lower contacts of relay S4, the lower break contacts of relay S1H, the lower break contacts of relay S5, the lamp SL, battery. The relay S4 remains operated in series with the *c*-lead until the cord is removed.

In the case of an emergency call, the contact K2 at the calling station is broken as described above and the winding I of relay KR is connected in series by way of contacts 1—2 of the selector and by the telephone T in the same way as for a routine call as described above. Because the contacts K2 are now broken, however, the polarized relay KR is attracted and remains closed. The *a*-lead of the line is grounded over its contacts K1 on relay KR.

When a normal call is not in progress, both LR1 and LR2 are operated and the following circuit is established: ground, contacts K1 on relay KR at the station A2, lead, L*a*, the lower break contacts on relay BR, lower winding of relay LR1, lower winding of relay LR2, break contacts of relay LR1, break contacts of switch VO, battery. After the operator at the central station has connected the cord, the relays S4 and BR operate as previously described in the case of a normal call, whereby relays LR1 and LR2 are disconnected and S1 and S2 are connected to the line. Relay S2 is now operated. The windings of the relays S2 and LR2 are opposed, so that the relays are attracted by grounding of the lead LA at contact K1 because one of the windings of S2 and LR2 is short-circuited.

By the grounding of the line lead caused by the relay KR, the relay S2 is attracted if a normal call is already in progress. In other cases LR2 is attracted and S2 is operated only after the cord plug is inserted.

By the relay LR2 the emergency lamp KL1 is lit, and by relay S2 the lamp KL2 is lit. When one of the emergency lamps is lit, the operator is instructed to at once operate the switch EO. (He also operates EO in answering routine calls.) Thereby the impulse sender "I*mp*1" is started by the plus potential from relay S2, whereby the windings of relay S3 and the number board or call indicator S6, which are connected in series, receive impulses simultaneously. Thereby the selectors advance synchronously with the number board, or call box indicator S6 because two current reversion contacts of S3 disconnect from the line circuit the normal battery, marked ground and negative, and connect another source of current, marked negative and positive 120 v., in opposite direction to the normal battery current. Each time the relay S3 is operated during the pulsation, the winding of the selector S receives a pulse through following circuit: plus 120 v., the lower make contacts of relay S3, the lower winding of relay S2, the lower winding of relay S1, the cord SS—SP, the line lead L*a*, the rectifier *n*2, the winding of selector S, break contacts of relay R, lead L*b* of the line, the cord SS, upper winding of relay S1, upper winding of relay S2, make contacts of relay S3, and negative 120 v.

When the selector S at the calling station has advanced to the position corresponding to the station whose relay KR is operated, the winding II of this relay receives current in series with the telephone and *n*1 in the opposite direction to the magnetizing direction of the relay. When this takes place the relay S3 is in non-operated position. The following circuit is thereby established: ground, upper break contacts of relay S3, upper winding of relay S2, upper winding of relay S1, cord SS—SP lead L*b* of the line, winding II of relay KR, contacts 3—4 of the selector, telephone T, rectifier *n*1, contacts K, lead L*a*, cord SS—SP, lower winding of relay S1, lower winding of relay S2, lower break contacts of relay S3, negative battery.

The winding II of relay KR receives current over the above current circuit, partly because the short-circuit contacts K3 of relay KR are broken, partly because the contacts 3—4 of the selector are closed and finally because the rest or home position contacts 1—2 of the selector are broken. Hereby the relay KR releases, disconnecting the grounding of the line, which causes relay S2 to release and the impulses both to S3 and the number board S6 are discontinued.

The operator extends the call elsewhere in ordinary way and returns the switch EO to its normal position. When the call is terminated, the relays S1 and S1H release. Because the relay S5 was operated by the closing of the lower contacts of relay S2, the impulse device "Imp2" sends readjusting impulses to all the selectors and to the number board S6. The impulse device "Imp2" was started when relay S5 operated as it received current over the contact K8 on the drawing. The following circuit is then established: ground at "Imp2," contact K9 of relay S5, contacts S11 of relay S1H, windings of relay S3 and the number board S6 over its make contacts S10, contacts S9 of relay S1H, contact S8 of the relay S5 and negative battery. When the relay S5 is released, the lamp SL is lit by current flowing in the same circuit as when a normal call is ended. The operator disconnects now the cord and alters the relays S4 and BR releases.

The number board is provided with a so-called rest or home position contact S10 which disconnects the winding for homing and makes S6 stop at the rest position.

The relay LR1, preferably of the polarized type, is so constructed, for example with an opposing winding or a so-called buffer spring (not shown on the drawing), that it operates also if the line is broken, i. e. when current through the terminating impedance *Dr* ceases. When the operator then answers, the armature of the relay S1 closes downwards and lights the lamp FL thus giving the fault signal. For this purpose relay S1 should be of the polarized type with a so-called mid-position adjusted armature. The operator may conveniently leave the cord in position during the time that the fault is being remedied. Conversations, both emergency and routine, are naturally expedited in the usual way during the fault period, but the relays LR1 and LR2 are naturally disconnected.

In the case of emergency speech, or speech following an emergency signal, when the impulses are sent, and thereby changes of polarity of current arise in the line, the lamp FL of course winks in time with the impulses. This can be remedied, for example by breaking the current circuit of the lamp by a breaking contact of the relay S3 or by connecting the current reversion contacts to the line side of S1. If the relay LR1 is of the polarized type, a special contact is obtained in the usual way for line faults, and this may be used in any desired way, i. e. for a lamp.

The impulse sending devices Imp1 and Imp2 are of known type, and they may continuously be generating impulses which are connected to the lines at the required times, or they may be started automatically only when needed. In a large installation, many loops of the kind having the stations A1, A2 . . . An will be needed, and the central station itself may be equipped with multiple answering positions each assigned to a group of loops. In such cases, a great deal of the equipment shown in Fig. 3 may be common to all of the central stations positions. Moreover, while the invention has been described in connection with a manual operator's position, it is clear that most of the operations can equally well be carried out with automatic line finding, answering and call completing devices known in the art of automatic telephony.

In describing the system, the use of two different "kinds" of signals has been mentioned in connection with initiating the two different "kinds" of calls, to wit, emergency and routine calls. The two kinds of signals are obtained respectively by (*a*) grounding of one side of the line L*a* and (*b*) placing the impedance of the telephone instrument across the two line conductors L*a* and L*b*. However, the two kinds of signals could differ from one another in other ways, if desired, so long as they are capable of giving unique effects at the central station by which the proper apparatus will be operated to distinguish the emergency call from the routine call.

What I claim as new and desire to secure by Letters Patent of the United States is:

1. In a telecommunication system especially adapted for police and fire communications, a plurality of calling stations each having a telephone instrument, a central station for the establishment of communications with the said calling stations and a line connecting all of the said calling stations in parallel with one another and to the central station, an impedance connected across that end of the line situated farthest away from the central station, said impedance having a relatively high ohmic value compared with the individual impedances of said calling stations, a source of voltage connected to said line at said central station, relay means at said central station responsive to both increases and decreases in the current in said line to give indications both of breaks in the line and the initiation of a call through connection of the telephone instrument of any calling stations across said line, pulse transmitting means at said central station, means at each calling station for initiating operation of said pulse transmitting means, a selector at each calling station for registering the pulses received over the line and for terminating the transmission of pulses after receipt of a predetermined number characteristic of that calling station, and means at the central station for registering the number of pulses transmitted.

2. In a telecommunication system, at least one calling station comprising a telephone set with an idle position and a speech position and with manually operable means to establish either of these positions, the telephone set having higher ohmic resistance for direct current in the idle position than in the speech position; a telephone exchange, an impedance connected across the end of the line situated farthest away from the exchange, having a relatively high ohmic resistance value compared with the resistance of the telephone set in the speech position, a current source at the exchange, and a current sensitive relay device connected to the line and individual to the line, having different positions for values of current in the line and in the relay device corresponding to (1) the normal current through the said impedance, (2) the current through the telephone set in its speech position and (3) reduced current in case of a breakdown in the line; the said relay device comprising signal contacts operable to give a signal indicative of said different values of current; a combined sensitive relay and indicating device in the exchange, common to a number of lines; a connecting device for connecting a selected line to the common relay device upon operation of the said signal contacts in the individual relay device; and means in the combined relay and indicating device for indicating by different values of current in the selected line the conditions produced by the telephone set in the speech position and by breakdown in the line.

3. The invention in accordance with claim 1, including a box housing said telephone set, a door for said box, a lock on said door, a switch operated by said lock, and means operated by said switch for effecting a signal on said line indicating the initiation of an emergency call.

4. In a telecommunication system, a plurality of calling stations, each including a telephone instrument and a switch for altering the calling station between an idle condition and a speaking condition upon lifting of the telephone instrument, a housing for said instrument and a door for said housing, manually operable locking means for said door, a second switch operated by said locking means; a central station, a current source at said station, a line connecting the calling stations with the source at the central station, an impedance connected across the end of the line most remote from said central station and having a higher resistance than that of each calling station when in speaking condition; means controlled by said second switch at each calling station for varying the resistance presented to the line by that station to produce a line current different from that corresponding to current through said impedance only and to current through a telephone instrument connected to the line, and a relay device at said central station responsive to current in said line and movable to different positions under the influence of the currents resulting from said impedance or a telephone instrument connected across said line or a high-resistance fault in said line.

5. A telecommunication system in accordance with claim 4, including a calling signal device at each calling station, and switch means at said central station for energizing all of said calling signal devices simultaneously over contacts of said relay device, whereby said calling signals are all de-energized when said relay device is operated to a position corresponding to the connection of any telephone instrument to said line.

6. In a telecommunication system, at least one calling station comprising a housing, a door, a lock for the door and a switch operated by the lock, a telephone set in said housing and having an idle position and a speech position and with manually operable means to establish either of these positions, the telephone set having higher ohmic resistance for direct current in the idle position than in the speech position; a telephone exchange; a line connecting the said calling station with said exchange, an impedance connected to the end of the line situated farthest away from the exchange, having a relatively high ohmic resistance value compared with the resistance of the telephone set in the speech position, a current source at the exchange, and a current sensitive relay device connected to the line and individual for the line, having different positions for values of current in the line and in the relay device corresponding to (1) breakdown in the line, (2) the current through the telephone subscriber's set in its speech position and (3) operation of said lock-operated switch; the said relay device comprising signal contacts operable to give a signal indicative of said different values of current; a combined sensitive relay and indicating device in the exchange, common to a number of lines; a connecting device for connecting a selected line to the common relay device upon operation of the said signal contacts in the individual relay device; means in the combined relay and indicating device for indicating by different values of current in the selected line the conditions produced by the telephone set in the speech position, upon breakdown in the line, and upon operation of said lock-operated switch.

7. A telecommunication system according to claim 6, including connections from the switching means operable by said locking means for transmission of a calling signal upon operation of the said switching means; the calling station comprising contacts operable upon the lifting of the telephone for the closing of a loop current circuit over the line to the exchange station for one other kind of calling signal, and the said switching means being operable by the locking means for the grounding of at least one lead of the said line circuit for the first named signal and means in the exchange station sensitive to the said both signals and having means for distinguishing these signals; the said sensitive device comprising optical signalling organs for different operation for these two different calling signals.

8. In a telecommunication system, a number of calling stations, each including a telephone accessible through a door member having manually operable locking means; a switching means operable by the said locking means; a telephone exchange comprising a relay device and a current source; a line for connecting the said calling station to the relay device and to the current source; an impedance connected to the end of the line situated farthest away from the exchange and means for connecting the said telephone to the line; the said switching means being operable by the locking means for variation of the electrical condition and thereby the value of the current in the line to a value different from the value obtained by the telephone being connected to the line and by the impedance; and a relay device at the exchange arranged to carry out different operations dependent on the current from the current source to the line as produced by (1) the said impedance and by (2) the telephone connected to the line by said means for connecting and by (3) the means operable by the locking means.

9. A telecommunication system according to claim 8, in which the switching means operable by the locking means comprises means for grounding one line lead; said relay devices in the telephone exchange comprising a relay sensitive to said ground condition from the calling station and signal pulse sending means in the exchange for sending pulse signals to the calling stations upon reception of the said ground signal, and finally a sensitive device at the calling station arranged to disconnect the ground on the recption of the signal from the exchange whereby the ground is disconnected during the telephone conversation.

10. In a telecommunication system, a number of calling stations, each comprising a subscriber's set with a telephone; a telephone exchange, a line connecting the exchange to the said calling stations; each calling station comprising means for the transmissions of at least two kinds of calling signals to the exchange and means for the prevention of conversations arising from one kind of call, when a call of the other kind is received by the exchange; means at the exchange for distinguishing between these two kinds of calls, and means at the exchange for the transmission of signal current for operating the said means for the prevention of conversations simultaneously at all the calling stations, whereby conversations initiated from one of the said kinds of calls have preference.

11. A telecommunication system according to claim 10, in which the means for transmission of at least two kinds of calling signals comprises contacts for the closing of a loop current circuit over the line to the exchange for one kind of calling signal and means for operating the said contacts by movement of the telephone; contacts for the grounding of at least one lead of the said loop circuit for the other kind of signal, and means for operating the said grounding contacts upon operating of locking means at the calling station; and means in the exchange for distinguishing between the two kinds of signals; the said means for distinguishing comprising optical signalling members for operation respectively by these two different calling signals.

12. A telecommunication system according to claim 10, each calling station comprising a step-by-step driven selector; means in the telephone exchange sensitive to one kind of calling signal; said sensitive means being combined with means for the sending of impulses to advance the step-by-step selector, each calling station being connected partly to contacts on the selector, in a different position for each calling station, and partly to home position contacts of the selector; the selector comprising means for interrupting the calling signal for stopping said sending of impulses in the telephone exchange when the corresponding calling station is reached, whereby a calling station telephone is connected into the line when the selector is advanced to the corresponding contacts.

13. In a telecommunication system, a number of calling stations each comprising a telephone set; a line; an exchange station; the said calling stations and the exchange station being connected to the line; each calling station comprising manually operable means of access; means combined with the said means of access and the telephone set in the calling station for sending out at least two different kinds of calling signals depending on operation of said means of access; a device in the exchange station sensitive to both kinds of signals, and means at the exchange station for distinguishing between these kinds of signals and means for obtaining verbal communication with the calling station for both kinds of calling signals sent from one of the calling stations; a selector in each calling station; a contact group in the said selector in a different position for each calling station for connecting a respective calling station to the line; a call indicator in the exchange station; the selector including means for signalling to the exchange station when the said certain position on the selector has been reached; an impulse sender in the exchange station connected to the distinguishing means for starting the sender for sending impulses to the selector in the calling stations and to the call indicator in the exchange station; the said distinguishing means being also sensitive to the said signal obtained when the certain position on the selector has been reached, for stopping the transmission of impulses when the particular calling station has been reached, whereby the station calling, at least for one kind of calling signal, can be identified, depending on the position to which the call indicator has advanced.

14. In a telecommunication system according to claim 13, the calling stations being combined with a signal receiver device, sensitive to signals of another kind than those which advance the selector and the telephone exchange, and including a further signal sending device for sending out the last-mentioned signals to the calling subscriber's stations.

15. A communication system in accordance with claim 2 in which at least one of the said relay devices individual to the line comprises an operating coil, an armature, contacts mounted for operation by said armature, respectively for different values of the current in said coil, and balancing means for maintaining said armature normally in a position corresponding to an intermediate value of current in said coil.

16. A communication system in accordance with claim 8 including contact means at each of said stations for selectively grounding one of said line conductors to obtain one kind of current condition in the line, and other contact means at each calling station for connecting an impedance across said line to initiate another kind of current condition in the line.

References Cited in the file of this patent

UNITED STATES PATENTS

| | | |
|---|---|---|
| 2,129,345 | Cover | Sept. 6, 1938 |
| 2,195,627 | Lomax et al. | Apr. 2, 1940 |